United States Patent [19]

Grossman et al.

[11] Patent Number: 5,660,357
[45] Date of Patent: Aug. 26, 1997

[54] AIRSTREAM EJECTED MISSILE ENGINE INLET COVER

[75] Inventors: Stephen P. Grossman, El Segundo; Stephen K. Laird, Manhattan Beach, both of Calif.

[73] Assignee: Northrop Grumman Corporation, Los Angeles, Calif.

[21] Appl. No.: 506,451

[22] Filed: Jul. 24, 1995

[51] Int. Cl.⁶ ................................................ B64D 45/00
[52] U.S. Cl. ...................... 244/121; 244/137.4; 244/53 B
[58] Field of Search .................................. 244/1 R, 129.1, 244/129.4, 121, 53 B, 137.1, 137.4; 89/1.811

[56] References Cited

U.S. PATENT DOCUMENTS

| | | | |
|---|---|---|---|
| 3,524,608 | 8/1970 | Nicholson et al. | 244/121 |
| 3,637,166 | 1/1972 | Nicholson et al. | 244/1 R |
| 3,667,704 | 6/1972 | Assmann | 244/53 B |
| 4,318,328 | 3/1982 | Rona | 89/1.815 |
| 4,867,357 | 9/1989 | Inglis et al. | 244/121 |
| 4,874,145 | 10/1989 | Prentice | 244/53 B |

*Primary Examiner*—Galen L. Barefoot
*Attorney, Agent, or Firm*—Terry J. Anderson; Karl J. Hoch, Jr.

[57] ABSTRACT

A missile engine inlet cover has an elongate air scoop having a rigid forward shell and a rearward attached flexible molded end piece. The missile engine inlet cover is held in place by the launch rail with the flexible molded end piece releasably inserted into or over the missile engine inlet. During missile launch, flow of air into the open end of the air scoop forces the air scoop to rotate rearward and dislodges the flexible molded end piece from the missile engine inlet to allow operation of the missile engine.

7 Claims, 1 Drawing Sheet

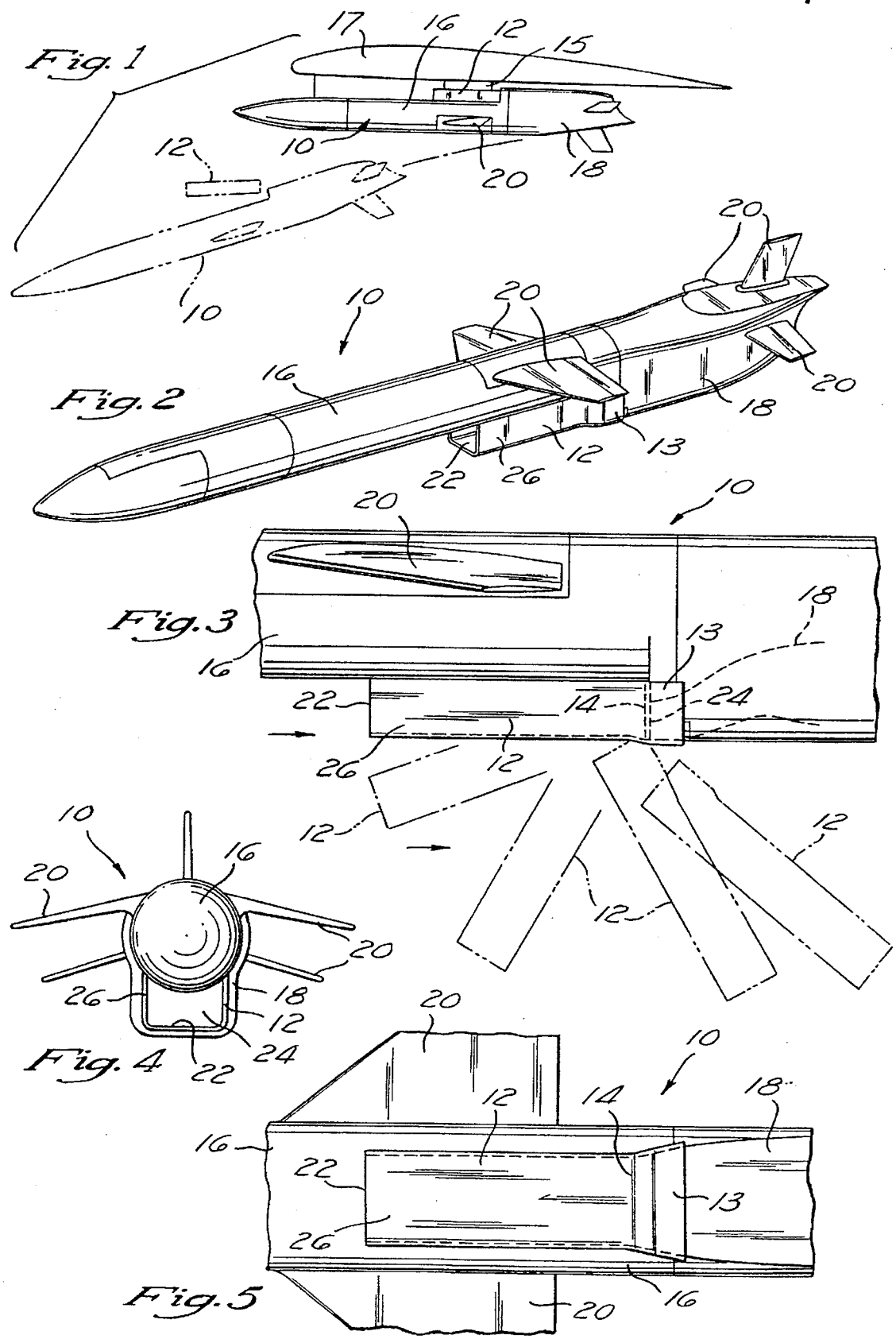

AIRSTREAM EJECTED MISSILE ENGINE INLET COVER

FIELD OF THE INVENTION

The present invention relates to a missile engine inlet cover which is ejected or separated from the missile by the action of the airstream during missile launch.

BACKGROUND OF THE INVENTION

Modern jet fighters and other military aircraft are commonly equipped with a variety of weapons, including self-propelled missiles. Many such missiles are powered by air breathing, i.e., jet, engines. During storage and transport of such self-propelled missiles, it is desirable to cover the missile engine inlet so as to prevent foreign matter from entering the missile engine. As those skilled in the art will appreciate, foreign matter ingested into the engine may cause serious damage thereto when the engine is subsequently started, as discussed in further detail below.

In use, such missiles are commonly attached to the exterior underside, i.e., within the bomb bay or beneath a wing, of an aircraft by a missile launch rail, pylon, or bomb rack. As used herein, the term "launch rail" is defined to include all such means for attaching a missile to an aircraft and more particularly refers to that portion of an aircraft to which a missile is attached.

It is further undesirable to allow the missile engine inlet to be exposed to the onrush of airflow during flight of the aircraft, but prior to missile launch, since such exposure may potentially result in damage to turbine bearings or other internal structures of the missile engine. Additionally, it is desirable to prevent the ingestion of foreign material, e.g., stones, debris, birds, etc., by the missile engine during takeoff, flight, and landing of the aircraft, just as it is during storage, handling, and transportation of the missile. The ingestion of such objects frequently results in major damage to the turbines of such jet engines, and may even endanger ground personnel during testing, i.e., ground operation, of the missile engine. Thus, the undesirable ingestion of foreign objects not only affects the operational effectiveness of the missile, but also presents a serious safety hazard.

However, once the missile is launched, it is necessary to allow air into the missile engine inlet to operate the missile engine. Thus, it is necessary to remove any missile engine inlet cover prior to or during launching of the missile.

Various forms of missile engine inlet covers have been proposed. Such prior art missile engine inlet covers utilize electrical, mechanical, hydraulic, or pneumatic retraction systems for removing the missile engine inlet cover during missile launch. While generally effective to facilitate timely retraction or removal of the missile engine inlet cover, such elaborate systems undesirably contribute to the multiplicity and complexity of systems on board the aircraft and/or missile, thereby resulting in additional weight and space requirements, as well as increased maintenance. Further, such complex contemporary systems are susceptible to in-flight failure, including premature or late retraction or removal of the cover, frequently resulting in missile failure.

In view of the deficiencies found in the prior art, it is desirable to provide a reliable missile engine inlet cover ejection system which does not depend upon any other electrical, mechanical, hydraulic, or pneumatic device or system.

SUMMARY OF THE INVENTION

The present invention comprises a missile engine inlet cover which closes a missile engine inlet to prevent undesirable ingestion of debris during handling, transportation, storage, and use of the missile. Preferably, the missile engine inlet cover includes an elongate air scoop member having a substantially rigid forward shell defining an open front end and a rearward flexible molded end piece defining a closed back end of the air scoop member. The rearward flexible end piece is preferably releasably inserted into or over the missile engine inlet. The flexibility of the end piece allows for a snug frictional fit. Alternatively, the end piece merely abuts the missile engine inlet to effect closure thereof.

When the flexible end piece is inserted into or over the missile engine inlet, the air scoop member extends forward, longitudinally along the missile body, so as to define an airflow path which extends from the front open end to the closed back end of the air scoop. Air pressure builds up along the airflow path during flight.

The forward shell is preferably generally U-shaped in a cross-sectional configuration and is defined by a pair of opposed side walls which extend in substantially parallel relationship with respect to one another and which contact the missile body. The forward shell is preferably further defined by a lower wall or floor which interconnects the two side walls to define an air scoop member. When installed upon a missile, the missile body forms an upper wall or ceiling so as to define an open ended tubular structure (the front end being open and the rear end being closed by the end piece).

During flight and prior to missile launch, the missile engine inlet cover is secured between the missile body and aircraft missile launch rail so as to prevent premature removal of the missile engine inlet cover.

During missile launch, when the missile launch rail no longer secures the missile engine inlet cover in place, the flow of air into the airflow path of the air scoop member facilitates the dislodgment of the flexible end piece from within or over the missile engine inlet and allows for separation of the air scoop member from the missile body. Thus, the force of air, i.e., the buildup of air pressure within the air scoop member, causes deformation of the flexible end piece, allowing dislodging of the missile engine inlet cover.

Thus, the missile engine inlet cover of the present invention comprises an air scoop configured to facilitate a build up of air pressure when disposed within an air stream and a cover member formed to the air scoop and configured to close the missile engine inlet. The build up of air pressure effects separation of the cover member from the missile engine inlet during launch so as to eliminate the need for contemporary electrical, mechanical, hydraulic, or pneumatic separation means. The cover member is configured to be captured intermediate the missile, preferably the body thereof, and a part of the aircraft, preferably the launch rail, pylon, or bomb rack thereof, so as to secure the cover member in position prior to launching of the missile.

As such, the missile engine inlet cover of the present invention is beneficial when used with a self-propelled missile having an engine and corresponding engine inlet, so as to close the missile engine inlet until the missile is launched. After the missile is launched and clears the launch rail, pressure from the rapidly moving airstream rotates the cover away from the missile, thus opening the engine inlet and allowing the engine to start. The removal of the cover is completely passive in the sense that it does not depend upon any other electrical, mechanical, hydraulic, or pneumatic system on the missile or aircraft. Removal of the cover requires only the airstream which is inherently present during an air launch.

BRIEF DESCRIPTION OF TH DRAWINGS

These, as well as other features of the present invention will become more apparent upon reference to the drawings wherein:

FIG. 1 is a side view of an air launched missile (in an upside down position) attached to the underside of an aircraft wing such that a missile engine inlet cover of the present invention closes the missile engine inlet and such that the missile engine inlet cover is captured intermediate the missile body and launch rail, and also showing in phantom the missile engine inlet cover separating from the missile as occurs during missile launch;

FIG. 2 is an enlarged perspective view of the missile, rotated to an upright position, showing the missile engine inlet cover attached thereto;

FIG. 3 is an enlarged side view of a portion of the missile body showing the missile engine inlet cover installed and showing in phantom the missile engine inlet cover being removed, as occurs during launch;

FIG. 4 is a front view of the missile having the missile engine inlet cover installed thereon; and FIG. 5 is a bottom view of the missile having the missile engine inlet cover installed thereon.

DETAILED DESCRIPTION OF THE PREFERRED EMBODIMENT

The detailed description as set forth below in connection with the appended drawings is intended as a description of the presently preferred embodiment of the present invention, and is not intended to represent the only form in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments which are also intended to be encompassed within the spirit and scope of this invention.

Referring now to the FIGS. 1–5 of the drawings, wherein the showings are for purposes of illustrating preferred embodiment of the present invention only, and are not for purposes of limiting the same. The missile 10 comprises an air scoop 12, which is attached at the aft end thereof to the missile engine inlet 14. The air scoop 12 is preferably attached to the missile engine inlet 14 by configuring the aft portion of the air scoop 12 such that it is either inserted into the missile engine inlet 14, or such that it is positioned over the missile engine inlet 14, as discussed in further detail below. Alternatively, the aft end of the air scoop 12 merely abuts the missile engine inlet 14 so as to seal the missile engine inlet 14.

The missile 10 comprises a generally cylindrical missile body 16 with an aft disposed missile engine 18. Flight control surfaces 20 extend from the missile body 16 according to well known construction.

As illustrated in FIG. 1, the missile 10 is in an inverted or upside down position wherein the missile engine inlet 14 is uppermost. As those skilled in the art will appreciate, such position need not necessarily be considered an inverted or upside down position, but rather the engine inlet cover of the present invention is likewise applicable to missiles wherein the missile engine inlet is formed uppermost with respect to the missile when the missile is upright. Thus, the missile engine inlet cover of the present invention may be utilized with both missiles having a missile engine inlet above the body and missiles having a missile engine inlet below the body thereof.

The elongate air scoop member 12 includes an open front end 22 and a closed back end 24. The closed back end is releasably insertable into or over the engine inlet 14 in such a manner as to position the elongate air scoop member 12 longitudinally along the missile body 16. An air path is therefore defined which extends from the open front end 22 to the closed back end 24. Accordingly, during missile launch, the flow of air into the airflow path results in an air pressure increase therein which dislodges the closed back end 24 from the engine inlet 14 and allows free separation of the air scoop member from the missile body as is shown in detail in FIG. 3.

The air scoop 12 preferably comprises a substantially rigid forward shell 26 and a cover member or flexible end piece 13 defining said closed back end 24 of the elongate air scoop member 12. The substantially rigid forward shell 26 preferably comprises a rigid lightweight material such as fiberglass or a polymer material. Those skilled in the art will appreciate that various such materials are sufficiently rigid so as not to deform substantially due to the buildup of air pressure therein during use.

The flexible end piece 13 is preferably formed of a molded resilient or flexible material, preferably a polymer, capable of deforming when a sufficient force is applied to the substantially rigid forward shell 26. Deformation of the flexible end piece 13 allows for a tight friction fit to the engine inlet 14, either to the inside or the outside thereof, and also allows for dislodgment of the flexible end piece 13 from the missile engine inlet 14 during launch, as the air stream rotates the air scoop 12 away from the missile 10. The substantially rigid forward shell 26 acts as an air pressure trap forcing the air scoop 12 away from the missile body 16.

As mentioned above, the air scoop 12 further comprises a closed back end 24. This closed back end 24 functions to seal the missile engine inlet 14. Thus, the closed back end 24 prevents undesirable foreign objects from entering the jet engine 18 of the missile 10. The closed back end 24 may either be formed as an integral portion of the substantially rigid forward shell 26, as an integral portion of the flexible end piece 13, or a separate piece connected to either the substantially rigid forward shell 26 or the flexible end piece 13. Thus, the closed back end 24 which seals the missile engine inlet 14 forms a part of the missile engine inlet cover. As mentioned above, the flexible end piece 13 frictionally engages the missile engine inlet 14 so to allow the air scoop 12 to be held in place during transport, storage, and use of the missile. During attachment to the airplane via a rail, the air scoop 12 is captured intermediate the missile body 16 and the rail 15 (FIG. 1).

Those skilled in the art will appreciate that various different pylons, bomb racks, and other attachment means are likewise suitable for attaching a missile to an aircraft wing and are likewise suitable for maintaining the missile engine inlet cover between itself and the missile body.

Once the missile drops from the rail, or is otherwise launched from the aircraft, the onrush of air into the air scoop 12 creates a force against the rigid forward shell 26 deforming the flexible molded end piece sufficiently to allow disengagement from the missile engine inlet 14. The airflow due to the speed of the flying aircraft is of sufficient velocity to reliably create the required force against the rigid forward shell 26 so as to insure removal of the missile engine inlet cover from the missile 10 during launch thereof.

Optionally, additional means may he utilized to secure the missile engine inlet cover to the missile 10 during handling, transport, and storage thereof. Those skilled in the art will appreciate that various latches, fasteners, etc., may he so utilized. Any such fastening means are preferably removed or disengaged prior to flight of the aircraft so as not to inhibit removal of the missile engine inlet cover during launch.

The advantage of the aforementioned system is that the removal of the air scoop 12 is completely passive in the sense that it does not depend on other electrical, mechanical, hydraulic, or pneumatic devices on the missile or aircraft. Once removed, the missile engine inlet 14 is open and free to receive the onrush of air so as to allow the missile engine 18 to operate as desired.

It is understood that the exemplary missile engine inlet cover described herein and shown in the drawings represents only a presently preferred embodiment of the invention. Indeed, various modifications and additions may be made to such embodiment without departing from the spirit and scope of the invention. For example, various different shapes and configurations of the air scoop 12 are contemplated. Additionally, the missile engine inlet cover need not necessarily comprise a separate end piece 13, but rather the air scoop itself may directly abut, contact, or otherwise engage the missile engine inlet 14. Thus, these and other modifications and additions may be obvious to those skilled in the art and may be implemented to adapt the present invention for use in a variety of different applications.

What is claimed is:

1. A missile engine inlet cover comprising:

a) an air scoop configured to facilitate a buildup of air pressure when disposed within an airstream; and b) a cover member formed to said air scoop and configured to close a missile engine inlet;

c) wherein the buildup of air pressure within said air scoop effects separation of said cover member from the missile engine inlet during launch.

2. The missile engine inlet cover as recited in claim 1 wherein said air scoop is configured to be captured intermediate a missile and an aircraft so as to secure said air scoop and cover member in position prior to launching said missile.

3. The missile engine inlet cover as recited in claim 1 wherein said air scoop and said cover member are integrally formed.

4. The missile engine inlet cover as recited in claim 1 wherein:

a) said air scoop is formed of a comparatively rigid material; and b) said cover member is formed of a comparatively flexible material.

5. The missile engine inlet cover as recited in claim 1 wherein said cover member is configured to be at least partially received within the missile engine inlet.

6. The missile engine inlet cover as recited in claim 1 wherein said cover member is configured to receive said missile engine inlet.

7. The missile engine inlet cover as recited in claim 1 wherein said cover member is configured to abut said missile engine inlet.

* * * * *